United States Patent [19]

Naik et al.

[11] Patent Number: 5,216,720
[45] Date of Patent: Jun. 1, 1993

[54] VOICE VERIFICATION CIRCUIT FOR VALIDATING THE IDENTITY OF TELEPHONE CALLING CARD CUSTOMERS

[75] Inventors: Jayant M. Naik, Dallas; Lorin P. Netsch, Allen; George R. Doddington, Richardson, all of Tex.

[73] Assignee: Texas Instruments Incorporated, Dallas, Tex.

[21] Appl. No.: 690,136

[22] Filed: Apr. 23, 1991

Related U.S. Application Data

[62] Division of Ser. No. 350,060, May 9, 1989, Pat. No. 5,054,083.

[51] Int. Cl.$^5$ .............................. G10L 5/00
[52] U.S. Cl. ........................................ 381/43
[58] Field of Search ............................ 381/41–43; 395/2

[56] References Cited

U.S. PATENT DOCUMENTS

| | | | |
|---|---|---|---|
| 3,896,266 | 7/1975 | Waterbury | 381/42 |
| 4,053,710 | 10/1977 | Advani et al. | 179/1 SB |
| 4,769,844 | 9/1988 | Fujimoto | 381/42 |

OTHER PUBLICATIONS

"Evaluation of a High Performance Speaker Verification System For Access Control", Jayant M. Naik et al., 1987 International Conference on Acoustics, Speech, and Signal Processing, Apr. 1987, vol. 4.
"High Performance Speaker Verification Using Principal Spectral Components", Jayant M. Naik et al, ICASSP 86 Proceedings, Apr., 1986, vol. 2.
"Speaker Verification Over Long Distance Telephone Lines", Jayant M. Naik et al., IEEE ICASSP-89, May, 1989.
Ney, "Speaker Recognition Using a Feature Weighting Technique", IEEE ICASSP '82, Paris, May 3–5, 1982, vol. 3, pp. 1645–1648.
Naik, et al., "Evaluation of a High Performance Speaker Verification System for Access Control", IEEE ICASSP '87, Dallas, Apr. 6–9, 1987, pp. 2392–2395.
Beetle, Jr., et al., "Speaker Verification System", IBM Technical Disclosure Bulletin, vol. 10, No. 8, Jan. 1968, pp. 1101–1103.
Gish, et al., "Investigation of Text-Independent Speaker Identification Over Telephone Channels", IEEE ICASSP '85, Tampa, Mar. 26–29, 1985, vol. 1, pp. 379–382.

Primary Examiner—Emanuel S. Kemeny
Attorney, Agent, or Firm—Pehr B. Jansson; Frank J. Kowalski; Leo N. Heiting

[57] ABSTRACT

An apparatus and method for verifying the identity of an unknown user of a telephone calling card service is disclosed which receives identification information corresponding to a valid user of the service, requests the unknown user to speak an authorization phrase without disclosing the authorization phrase to the unknown user, receives the unknown user's speech signal in response to the request, and verifies the identity of the unknown user based on the received speech signal. Other apparatus, systems, and methods are also disclosed.

8 Claims, 2 Drawing Sheets

VOICE VERIFICATION CIRCUIT FOR VALIDATING THE IDENTITY OF TELEPHONE CALLING CARD CUSTOMERS

This is a division of application Ser. No. 07/350,060, filed May 9, 1989 now U.S. Pat. No. 5,054,083.

TECHNICAL FIELD OF THE INVENTION

This invention relates in general to speech analysis, and more particularly to a high performance speaker verification system including speaker discrimination.

BACKGROUND OF THE INVENTION

In many applications, it is necessary to verify the identity of an unknown person. One example of an identity verification device is a photo badge by which an interested party may compare the photo on the badge with the person claiming an identity in order to verify the claim. This method of verification has many shortcomings. Badges are prone to loss and theft, and relatively easy duplication or adulteration. Furthermore, the inspection of the badge must be performed by a person, and is thus not applicable to many situations where the verification must be done by a machine. In short, an effective verification system or device must be cost-effective, fast, accurate, easy to use and resistant to tampering or impersonation.

Long distance credit card services, for example, must identify a user to ensure that an impostor does not use the service under another person's identity. Prior art systems provide a lengthy identification number (calling card number) which must be entered via the phone's keypad to initiate the long distance service. This approach is prone to abuse, since the identification number may be easily appropriated by theft, or by simply observing the entry of the identification number by another. It has been estimated that the loss to the long distance services due to unauthorized use exceeds $500,000,000 per year.

Speaker verification systems have been available for several years. However, most applications require a very small true speaker rejection rate, and a small impostor acceptance rate. If the true speaker rejection rate is too high, then the verification system will place a burden on the users. If the impostor acceptance rate is too high, then the verification system may not be of value. Prior art speaker verification systems have not provided the necessary discrimination between true speakers and impostors to be commercially acceptable in applications where the speaking environment is unfavorable.

Speaker verification over long distance telephone networks present challenges not previously overcome. Variations in handset microphones result in severe mismatches between speech data collected from different handsets for the same speaker. Further, the telephone channels introduce signal distortions which reduce the accuracy of the speaker verification system. Also, there is little control over the speaker or speaking conditions.

Therefore, a need has arisen in the industry for a system to prevent calling card abuse over telephone lines. Further, a need has arisen to provide a speaker verification system which effectively discriminates between true speakers and impostors, particularly in a setting where verification occurs over a long distance network.

SUMMARY OF THE INVENTION

In accordance with the present invention, a speaker verification method and apparatus is provided which substantially reduces the problems associated with prior verification systems.

A telephone long distance service is provided using speaker verification to determine whether a user is a valid user or an impostor. The user claims an identity by offering some form of identification, typically by entering a calling card number on the phone's touch-tone keypad. The service requests the user to speak a speech sample, which is subsequently transformed and compared with a reference model previous created from a speech sample provided by the valid user. The comparison results in a score which is used to accept or reject the user.

A telephone service verification system for verifying the identity of an unknown user of a telephone calling card service according to the present invention includes circuitry to receive identification information corresponding to a valid user of the service, circuitry for requesting the unknown user to speak an authorization phrase, wherein such request is made without at any time disclosing the authorization phrase to the unknown user, circuitry for receiving the unknown user's speech signal in response to the request, and circuitry for verifying the identity of the unknown user based on the received speech signal and the identification information.

The telephone service verification system of the present invention provides significant advantages over the prior art. In order to be accepted, an impostor would need to know the correct phrase, the proper inflection and cadence in repeating the phrase, and would have to have speech features sufficiently close to the true speaker. Hence, the likelihood of defeating the system is very small.

The speaker verification system of the present invention receives input speech from a speaker of unknown identity in the form of identification information corresponding to a valid user of the service. The unknown user is then requested to speak an authorization phrase without the system disclosing the authorization phrase to the unknown user. The unknown user's speech signal in response to the request is received. The speech signal is subjected to an LPC analysis to derive a set of spectral and energy parameters based on the speech signal energy and spectral content of the speech signal. These parameters are transformed to derive a template of statistically optimum features that are designed to maximize separability between true speakers and known impostors. The template is compared with a previously stored reference model for the true speaker. A score is derived from a comparison with the reference model which may be compared to a threshold to determine whether the unknown speaker is a true speaker or an impostor. The comparison of the input speech to the reference speech is made using Euclidean distance measurements (the sum of the squares of distances between corresponding features) using either Dynamic Time Warping or Hidden Markov Modeling.

In one aspect of the present invention, the transformation is computed using two matrices. The first matrix is a matrix derived from the speech of all true speakers in a database. The second matrix is a matrix derived from all impostors in the database, those whose speech may be confused with that of a true speaker. The second database provides a basis for discriminating between true speakers and known impostors, thereby increasing the separability of the system.

The speaker verification system of the present invention provides significant advantages over prior art systems. First, the percentage of impostor acceptance relative to the percentage of true speaker rejection is decreased. Second, the dimensionality of the transformation matrix may be reduced, thereby reducing template storage requirements and computational burden.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE INVENTION

The preferred embodiment of the present invention is best understood by referring to FIGS. 1–6 of the drawings.

Figure 1:
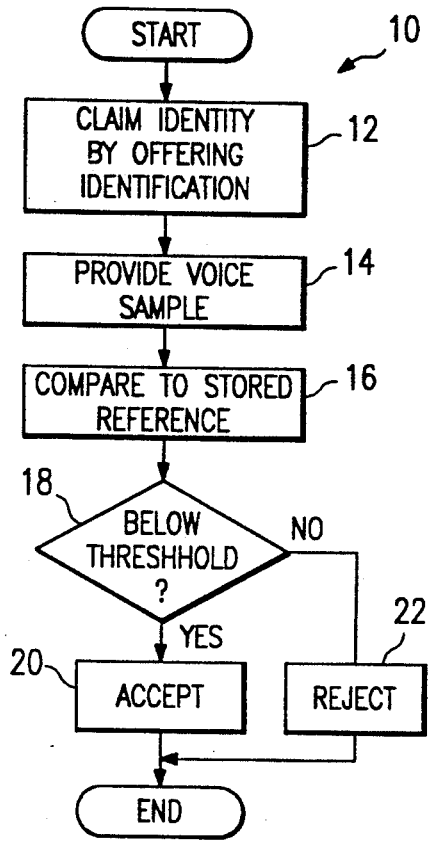
FIG. 1 illustrates a flow chart depicting a personal identity verification system for long-distance calling card services using speech verification.

FIG. 1 illustrates a flow chart 10 depicting personal identity verification using speaker verification in connection with a long-distance calling card service. In block 12, a person claims an identity by offering some information corresponding to a unique identification. For example, a long distance telephone subscriber may enter a unique ID number to claim his identity. In other applications, such as entry to a building, a person may claim identity by presenting a picture badge.

Since the identification offered in block 12 is subject to theft and/or alteration, the personal identity verification system of the present invention requests a voice sample from the person in block 14. In block 16, the voice sample provided by the person is compared to a stored reference voice sample which has been previously obtained for the speaker whose identity is being claimed (the "true" speaker). Supplemental security is necessary to ensure that unauthorized users do not create a reference model for another valid user. If the voice sample correlates with the stored voice sample according to predefined decision criteria in decision block 18, the identity offered by the person is accepted in block 20. If the match between the reference voice sample and the input speech utterance does not satisfy the decision criteria in decision block 18, then the offered identity is rejected in block 22.

Figure 2:
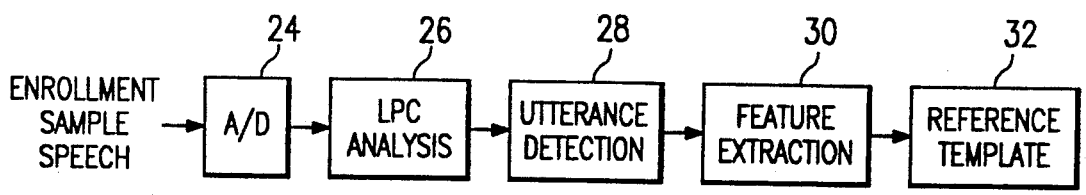
FIG. 2 illustrates a block diagram depicting enrollment of a speaker into the speaker verification system of the present invention.

FIG. 2 illustrates a block diagram depicting enrollment of a user's voice into the speaker verification system of the present invention. During the enrollment phase, each user of the system supplies a voice sample comprising an authorization phrase which the user will use to gain access to the system. The enrollment speech sample is digitized using an analog-to-digital (A/D) converter 24. The digitized speech is subjected to a linear predictive coding (LPC) analysis in circuit 26. The beginning and end of the enrollment speech sample are detected by the utterance detection circuit 28. The utterance detection circuit 28 estimates a speech utterance level parameter from RMS energy (computed every 40 msec frame) using fast upward adaptation and slow downward adaptation. The utterance detection threshold is determined from a noise level estimate and a predetermined minimum speech utterance level. The end of the utterance is declared when the speech level estimate remains below a fraction (for example 0.125) of the peak speech utterance level for a specified duration (for example 500 msec). Typically, the utterance has a duration of 2–3 seconds.

The feature extraction circuit 30 computes a plurality of parameters from each frame of LPC data. In the preferred embodiment, thirty-two parameters are computed by the feature extraction circuit 30, including:

a speech level estimate;
RMS frame energy;
a scalar measure of rate of spectral change;
fourteen filter-bank magnitudes using MEL-spaced simulated filter banks normalized by frame energy;
time difference of frame energy over 40 msec; and
time difference of fourteen filter-bank magnitudes over 40 msec.

The feature extraction circuit 30 computes the thirty-two parameters and derives fourteen features (the least significant features are discarded) using a linear transformation of the LPC data for each frame. The formation of the linear transformation matrix is described in connection with the FIG. 5. The fourteen features computed by the feature extraction circuit 30 for each 40 msec frame are stored in a reference template memory 32.

Figure 3:
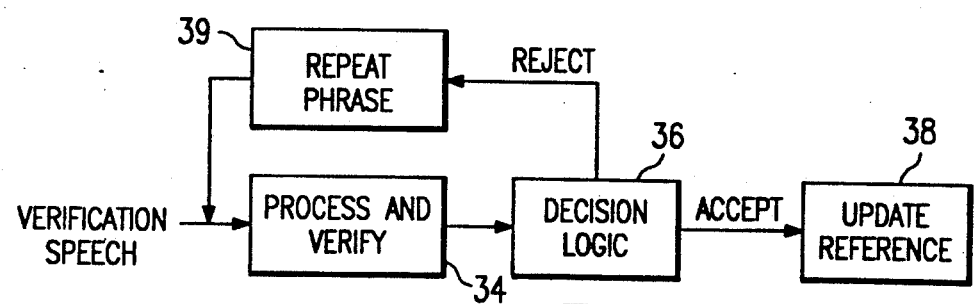
FIG. 3 illustrates a block diagram depicting the verification and reference update used in the present invention.

FIG. 3 illustrates a block diagram depicting the verification circuit. The person desiring access must repeat the authorization phrase into the speech verification system. Many impostors will be rejected because they do not know the correct authorization phrase. The input speech (hereinafter "verification speech") is input to a process and verification circuit 34 which determines whether the verification speech matches the speech submitted during enrollment. If the speech is accepted by decision logic 36, then the reference template is updated in circuit 38. If the verification speech is rejected, then the person is requested to repeat the phrase. If the verification speech is rejected after a predetermined number of repeated attempts, the user is denied access.

Figure 4:
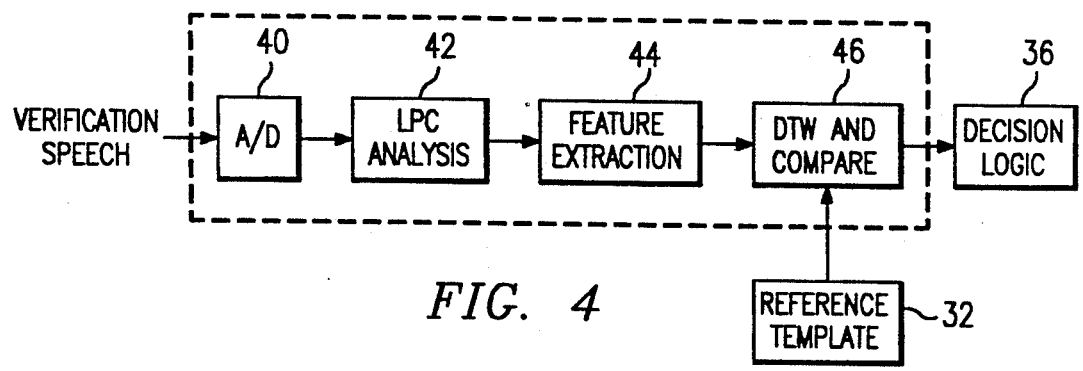
FIG. 4 illustrates a block diagram depicting the verification system used in the present invention.

After each successful verification, the reference template is updated by averaging the reference and the most recent utterance (in the feature domain) as follows:

$$R_{new} = (1-a)R_{old} + aT$$

where, $a = \min(\max(1/n, 0.05), 0.2)$,
n = session index
R = reference template data T = last accepted utterance A block diagram depicting verification of an utterance is illustrated in FIG. 4. The verification speech, submitted by the user requesting access, is subjected to A/D conversion, LPC analysis, and feature extraction in blocks 40-44. The A/D conversion, LPC analysis and feature extraction are identical to the processes described in connection with FIG. 2.

The parameters computed by the feature extraction circuit 44 are input to a dynamic time warping and compare circuit 46. Dynamic time warping (DTW) employs an optimum warping function for nonlinear time alignment of the two utterances (reference and verification) at equivalent points of time. The correlation between the two utterances is derived by integrating over time the euclidean distances between the feature parameters representing the time aligned reference and verification utterances at each frame. The DTW and compare circuit 46 outputs a score representing the similarities between the two utterances. The score is compared to a predetermined threshold by decision logic 36, which determines whether the utterance is accepted or rejected.

In order to compute the linear transformation matrix used in the feature extraction circuits 44 and 30, a speech database is collected over a group of users. If, for example, the speech database is to be used in connection with a telephone network, the database speech will be collected over the long distance network to provide for the variations and handset microphones and signal distortions due to the telephone channel. Speech is collected from the users over a number of sessions. During each session, the users repeat a authorization phrase, such as "1650 Atlanta, Ga." or a phone number such as "765-4321".

Figure 5A:
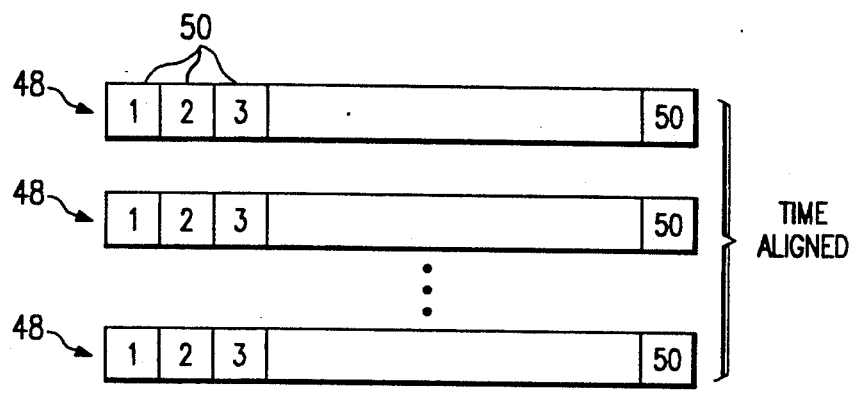
FIG. 5a illustrates the vectors used to form the in-class and inter-class matrices used to form the transformation matrix in the present invention.

FIG. 5a illustrates the speech data for a single user. The database utterances are digitized and subjected to LPC analysis as discussed in connection with FIG. 2. Consequently, each utterance, 48 is broken into a number of 40 msec frames 50. Each frame is represented by 32 parameters, as previously discussed herein. Each speaker provides a predetermined number of utterances 48. For example, in FIG. 5a, each speaker provides 40 utterances. An initial linear transformation matrix $[L_d]$ or "in-class" covariance matrix $[L]$ is derived from a principal component analysis performed on a pooled covariance matrix computed over all true speakers. To compute the initial linear transformation matrix $[L_d]$, covariance matrices are computed for each speaker over the 40 (or other predetermined number) time aligned database utterances 48. The covariance matrices derived for each speaker in the database are pooled together and diagonalized. The initial linear transformation matrix is made up of the eigenvectors of the pooled covariance matrix. The resulting diagonalized initial linear transform matrix will have dimensions of 32×32; however, the resulting matrix comprises uncorrelated features ranked in decreasing order of statistical variance. Therefore, the least significant features may be discarded. The resulting initial linear transformation (after discarding the least significant features) accounts for approximately 95% of the total variance in the data.

In an important aspect of the present invention, the initial linear transformation matrix is adjusted to maximize the separability between true speakers and impostors in a given data base. Speaker separability is a more desirable goal than creating a set of statistically uncorrelated features, since the uncorrelated features may not be good discriminant features.

An inter-class or "confusion" covariance matrix is computed over all time-aligned utterances for all successful impostors of a given true speaker. For example, if the database shows that the voice data supplied by 120 impostors (anyone other than the true speaker) will be accepted by the verification system as coming from the true speaker, a covariance matrix is computed for these utterances. The covariance matrices computed for impostors of each true speaker are pooled over all true speakers. The covariance matrix corresponding to the pooled impostor data is known as the "inter-class" or "confusion" covariance matrix $[C]$.

Figure 5B:
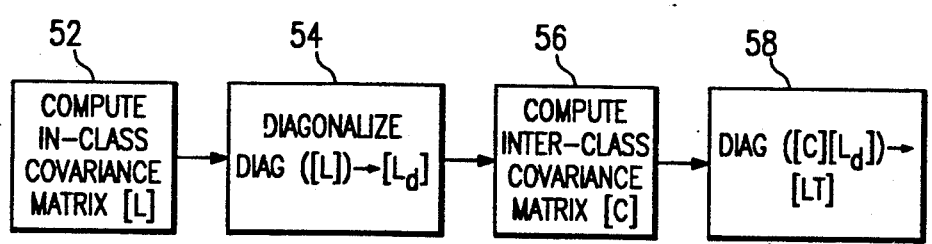
FIG. 5b illustrates a block diagram depicting the formation of the speaker discrimination transformation matrix.

To compute the final linear transformation matrix $[LT]$, the initial linear transformation covariance matrix $[L]$ is diagonalized, resulting in a matrix $[L_d]$. The matrix $[L_d]$ is multiplied by the confusion matrix $[C]$ and is subsequently diagonalized. The resulting matrix is the linear transformation matrix $[LT]$. The block diagram showing computation of the linear transformation matrix is illustrated in FIG. 5b in blocks 52-58.

The transformation provided by the confusion matrix further rotates the speech feature vector to increase separability between true speakers and impostors. In addition to providing a higher impostor rejection rate, the transformation leads to a further reduction in the number of features used in the speech representation (dimensionality), since only the dominant dimensions need to be preserved. Whereas, an eighteen-feature vector per frame is typically used for the principal spectral components, it has been found that a fourteen-feature vector may be used in connection with the present invention. The smaller feature vector reduces the noise inherent in the transformation.

Figure 6:
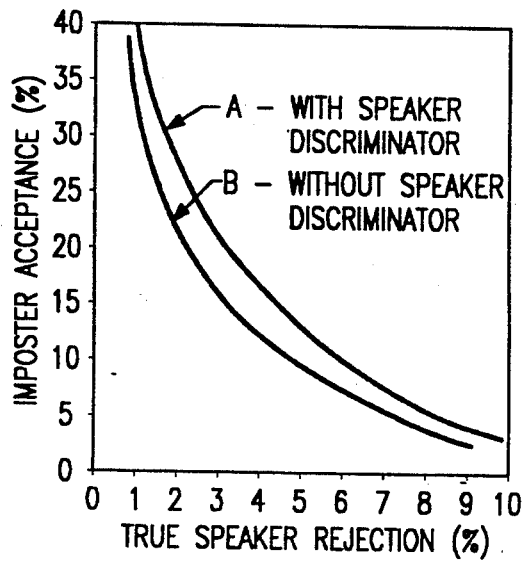
FIG. 6 illustrates a comparison of the speaker verification system of the present invention as compared to a prior art speaker verification system.

Experimental results comparing impostor acceptance as a function of true speaker rejection is shown in FIG. 6. In FIG. 6, curve "A" illustrates impostor acceptance computed without use of the confusion matrix Curve "B" illustrates the impostor acceptance using the confusion matrix to provide speaker discrimination. As can be seen, for a true speaker rejection of approximately two percent, the present invention reduces the impostor acceptance by approximately ten percent.

In addition to the dynamic time warping (time-aligned) method of performing the comparison of the reference and verification utterances, a Hidden Markov Model-based (HMM) comparison could be employed. An HMM comparison would provide a state-by-state comparison of the reference and verification utterances, each utterance being transformed as described hereinabove. It has been found that a word by word HMM comparison is preferable to a whole-phrase comparison, due to the inaccuracies caused mainly by pauses between words.

Although the present invention has been described in detail, it should be understood that various changes, substitutions and alterations can be made herein without departing from the spirit and scope of the invention as defined by the appended claims.

What is claimed is:

1. Apparatus for verifying the identity of an unknown user of a telephone calling card service, comprising:
    circuitry to receive identification information corresponding to a valid user of the service;
    circuitry for requesting the unknown user to speak an authorization phrase without at any time disclosing the authorization phrase to the unknown user;

circuitry for receiving the unknown user's speech signal in response to the request;

circuitry for coding said received speech signal into a set of predetermined parameters;

circuitry for transforming said parameters to maximize the separation between true speakers and known impostors; and circuitry for verifying the identity of the unknown user based on the coded received speech signal and the identification number.

2. The apparatus of claim 1 wherein said circuitry for receiving identification comprises circuitry for receiving signals corresponding to an identification number.

3. The apparatus of claim 1 wherein said verifying circuitry comprises:

circuitry to transform the speech signal into speech features; and circuitry to compare the speech features with stored reference speech features obtained from the valid user.

4. The apparatus of claim 3 and further comprising circuitry for updating the reference speech features after verifying that the unknown user is a valid user.

5. A method of verifying the identity of an unknown user of a telephone calling card service, comprising the steps of:

receiving identification information corresponding to a valid user of the service;

requesting the unknown user to speak an authorization phrase without at any time disclosing the authorization phrase to the unknown user;

receiving the unknown user's speech signal in response to the request;

coding said received speech signal into a set of predetermined parameters;

transforming said parameters to maximize the separation between true speakers and known impostors; and verifying the identity of the unknown user based on the coded received speech signal and identification information.

6. The method of claim 5 wherein said step of receiving identification comprises the step of receiving signals corresponding to an identification number.

7. The method of claim 5 wherein said verifying step comprises:

transforming the speech signal into speech features; and comparing the speech features with stored reference speech features obtained from the valid user.

8. The method of claim 7 and further comprising the step of updating the reference speech features after verifying that the unknown user is the valid user.

* * * * *